(12) United States Patent
Slatter

(10) Patent No.: US 6,760,117 B2
(45) Date of Patent: Jul. 6, 2004

(54) MEASUREMENT APPARATUS

(75) Inventor: David Neil Slatter, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 143 days.

(21) Appl. No.: 10/058,288

(22) Filed: Jan. 30, 2002

(65) Prior Publication Data

US 2002/0101594 A1 Aug. 1, 2002

(30) Foreign Application Priority Data

Jan. 31, 2001 (GB) .............................. 0102413

(51) Int. Cl.⁷ .............................. G01B 11/14
(52) U.S. Cl. .................. 356/625; 356/627; 356/628; 356/634; 356/635; 356/601
(58) Field of Search ................. 356/601, 625, 356/627, 628, 629, 630, 634, 635; 382/232, 173

(56) References Cited

U.S. PATENT DOCUMENTS 4,503,469 A * 3/1985 Kato ........................ 358/451
4,730,190 A * 3/1988 Win et al. ................. 342/118
4,801,207 A * 1/1989 Williams .................. 356/606
5,440,396 A * 8/1995 Markus et al. ............ 356/394

FOREIGN PATENT DOCUMENTS

GB    2 347 040    8/2000

* cited by examiner

Primary Examiner—Frank G. Font
Assistant Examiner—Roy M. Punnoose
(74) Attorney, Agent, or Firm—Foley & Lardner LLP

(57) ABSTRACT

Measurement apparatus for measuring at least one of a length, surface area or volume of an object (or portion thereof) or area (22) (or portion thereof). The apparatus includes means for creating a three-dimensional map of an object or area to be measured and a touch-sensitive screen (16) for displaying the mapped image of the object or area. The user can select the area (22) of interest by drawing around it on the screen to create an outline of its shape and the apparatus then creates a virtual shape (20) which matches the outline and maps it onto the image. The user can alter the size, angle, pitch, etc. of the virtual shape (20) until it matches the area (22) exactly and the apparatus then determines the length, surface area and/or volume of the area (22), as required.

19 Claims, 2 Drawing Sheets

US 6,760,117 B2

MEASUREMENT APPARATUS

FIELD OF THE INVENTION

This invention relates to measurement apparatus and, in particular, to apparatus for measuring length, surface area, volume and the like of three dimensional objects.

BACKGROUND TO THE INVENTION

In many different applications it is desirable to be able to accurately measure the length, surface area or volume, for example, of an object or enclosure. In particular, for example, it is often desirable to be able to estimate the quantity of paint or wallpaper one might require to decorate a room, or the number of tiles which may be required to cover a roof. However, it is often impractical, difficult or simply impossible to measure the required dimension by hand using a tape measure or the like.

U.S. Pat. No. 4,730,190 describes a hand-held measuring device which operates effectively as a remote tape measure. Thus, the user measures the three dimensions of, for example, a room and the device multiplies the three dimensions to give the volume of the room.

However, this type of device is time-consuming to use and prone to error. Further, it is really only suitable for giving accurate volume measurements of substantially uniform right-angled areas. It would not give an accurate measurement for an area having curved or irregular sides, for example, and straight line approximations are not accurate enough for many applications. Further, the area to be measured must be accessible to the user in order for the relevant lengths to be measured. Thus, for example, it would be difficult for a user to measure the volume or surface area of a roof without having to climb up on the roof to take the relevant measurements.

We have now devised an arrangement which overcomes the problems outlined above.

SUMMARY OF THE INVENTION

In accordance with the present invention, there is provided a measurement apparatus for measuring at least one parameter of an object or area, the measurement apparatus comprising one or more imaging and display devices for creating a three-dimensional map and displaying an image of said object or area, mapping apparatus for mapping a virtual shape onto said image and substantially matching said shape to said object or area, the measurement apparatus being adapted to determine from said image at least one parameter of said object or area, said parameter comprising at least one of a length, surface area or volume of said object or area.

It will be appreciated that the shape matching takes place in a two-dimensional image space, and the apparatus can create any (selected or otherwise) two-dimensional perspective from the three-dimensional map, thereby permitting a user to choose the perspective in which matching takes place, which may be particularly important in the case where important matching points cannot be seen from a particular perspective.

The present invention also extends to a method of measuring an object or area, the method comprising the steps of creating a three-dimensional map and displaying an image of an object or area to be measured, mapping a virtual shape onto said image, substantially matching said virtual shape to said object or area being measured, and determining at least one of a length, surface area or volume of said object or area.

The apparatus preferably includes means for marking or otherwise selecting the object or area to be measured within an image, by defining an outline of the shape of said object or area. The apparatus then preferably creates a virtual shape which substantially matches the outline. The apparatus beneficially includes means for permitting the user to alter one or more of the size, angle or pitch of the virtual shape.

Thus, the present invention employs an imaging technique which can recover depth as well as azimuth and elevation. The apparatus of the present invention is particularly (but not exclusively) useful for quickly and accurately estimating quantities of, for example, paint, wallpaper, tiles or carpet required for a particular area. In fact, the apparatus may include means for providing an estimate of the amount of such materials which are required. It may also include means for taking into account standard material widths, lengths, volumes, etc, when estimating the quantities of a material required to be obtained.

BRIEF DESCRIPTION OF THE DRAWINGS

An exemplary embodiment of the present invention will now be described with reference to the accompanying drawings, in which.

DETAILED DESCRIPTION OF THE INVENTION

There are various imaging devices in accordance with the prior art which can construct a three dimensional map of an object, area or environment of interest. Generally, in these devices, two or more imaging devices, such as cameras, are separated in space and arranged to capture a respective image of the object, area or environment of interest.

Figure 1:
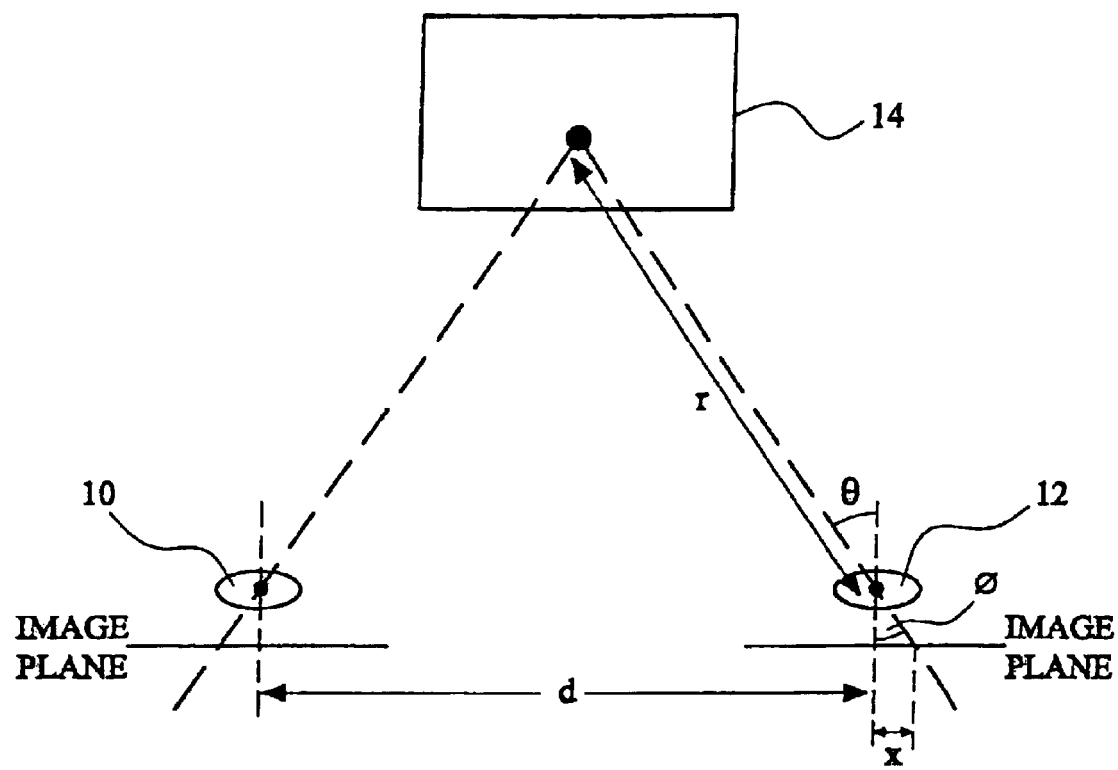
FIG. 1 is a schematic diagram to illustrate the "correspondence" and triangulation techniques used in some prior art imaging devices to construct a three-dimensional map of an object, area or environment.

Referring now to FIG. 1 of the drawings, two imaging devices 10, 12 are arranged in spaced apart relation relative to an object 14 of interest. The degree of separation d of the imaging devices 10, 12 is known or can be measured.

Correspondence between the image points for each point on the object 14 as captured by the imaging devices 10, 12 is established by a pattern matching algorithm. For example, Stereo (two image) adaptive least square matching as described in Chapter 8 of Close Range Photogrammetry and Machine Vision edited by K. B. Atkinson (Whittles Publishing 1996). The position of an image point in the image plane of a camera along with knowledge of its focal length directly gives the azimuth and elevation angle of the object point relative to that camera.

The depth of the point on object 14 can now be established by "triangulation" in which an imaginary triangle is drawn between the point on object 14 and the corresponding points on the images (as shown in FIG. 1). In the simplest case when the elevation angle is zero, the imaginary triangle has baseline length d and the two angles at the base of the triangle are the azimuth angles of the object point as seen from each camera. The distance of the object from the baseline can now be calculated using standard trigonometrical formulae. See Three Dimensional Computer Vision by Olivier Faugeras (MIT Press 1993) for a full mathematical treatment.

The result is an image of the object 14 made up of a plurality of pixels, each of the pixels containing (or having associated therewith) a depth value (i.e. information relating to the depth) for all points on the object 14. In other words, an image of the object 14 in which the three-dimensional position of each pixel is known.

Figure 2:
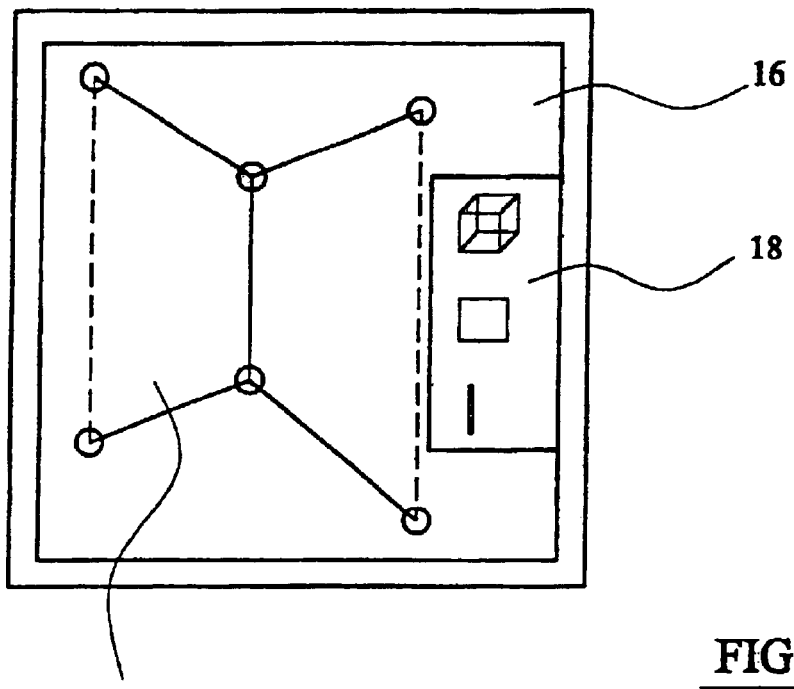
FIG. 2 is a schematic representation of an exemplary embodiment of the present invention in which a user has marked or drawn around an object or area of interest.

Referring now to FIG. 2 of the drawings, in the apparatus according to an exemplary embodiment of the present invention, such a three dimensionally mapped image of an environment of interest is created and displayed on a screen 16. The user can mark the area 22 of the image which is required to be measured, using, for example, any known video display pen marking methods on a touch-sensitive screen 16, by drawing roughly around the apparent edges of the area 22.

The apparatus further comprises a menu 18 (also displayed on the screen 16) giving a user the option to select one of a number of predefined measurements, such as length, surface area, volume, etc. The user selects a desired measurement for the marked area 22.

Figure 3:
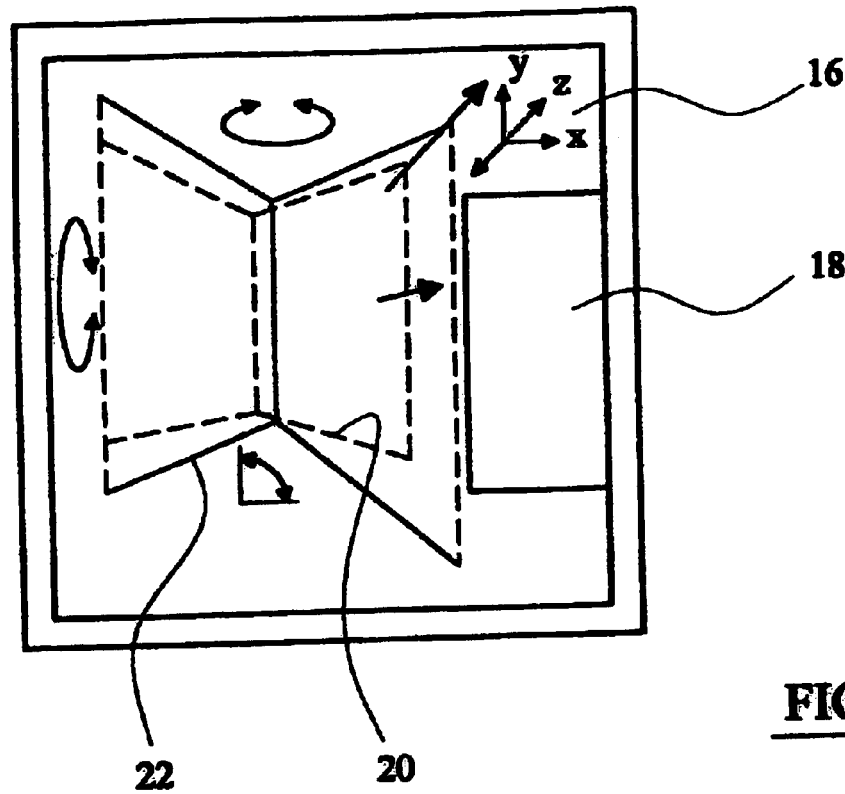
FIG. 3 is the apparatus of FIG. 2 in which a virtual shape has been created and demonstrating that the user can alter the shape with a plurality of degrees of freedom to substantially match it to the object or area of interest.

The apparatus then creates a virtual shape 20 to match the selected area 22 and overlays it on the image. The user can alter the size, pitch angle, etc. of the virtual shape 20 as required to match it as closely as possible to the area of interest (see FIG. 3). It is envisaged to provide up to six degrees of freedom to the user for alteration of the virtual shape 20 to match it to the area 22 of interest.

Figure 4:
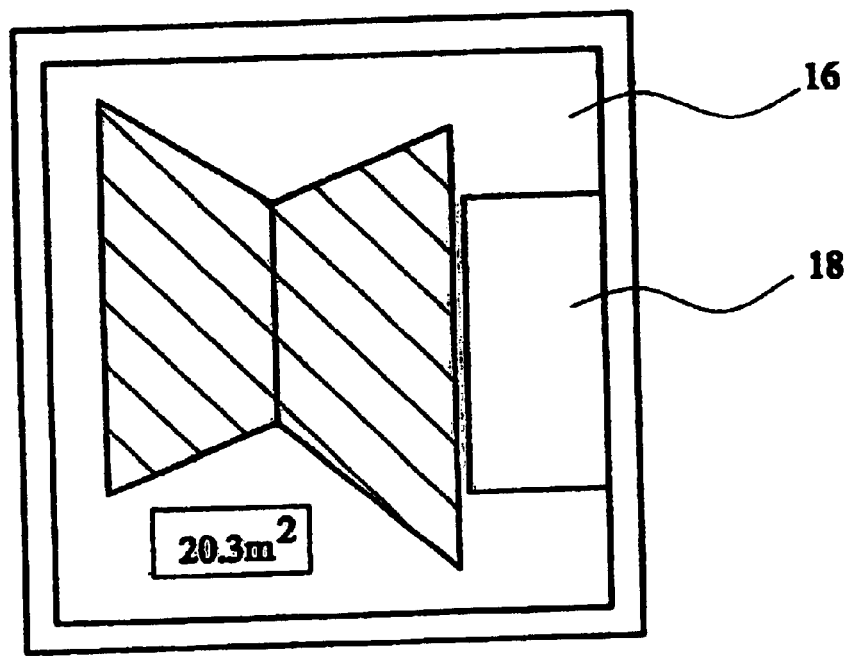
FIG. 4 is the apparatus of FIG. 3 in which the surface area of the object or area of interest is calculated and displayed.

Once the virtual shape 20 is as closely matched as possible, the user selects the calculate option. Because the θ, φ and r values of all coordinates of the area 22 are known, the same values of all coordinates of the virtual shape 20 are also known. Further, the focal length of the imaging devices 10, 12 are known (or can be determined), so measurements such as surface area, volume, etc. of the area 22 of interest can be accurately calculated (see FIG. 4).

Thus, estimates of length, surface area, volume, etc. can be quickly and efficiently obtained.

It is envisaged that, in an alternative embodiment of the invention, the apparatus may be arranged to automatically match the virtual three-dimensional shape onto the area of interest. Further, it is envisaged that the apparatus may also provide a plurality of predefined virtual shapes for selection by the user, which can then be dragged into the image space.

An algorithm for fitting standard material widths to irregular areas could also be employed.

An embodiment of the present invention has been described above by way of example only, and it will be apparent to a person skilled in the art that modifications and variations can be made without departing from the scope of the invention as defined in the appended claims.

What is claimed is:

1. A measurement apparatus for measuring at least one parameter of an object, the measurement apparatus comprising:
   at least one imaging device configured to create a three-dimensional map of said object;
   at least one display device configured to display an image of said object based at least in part on said three-dimensional map; and
   a mapping apparatus configured to map a virtual shape onto said image and to substantially match said virtual shape to said three-dimensional map of said object,
   wherein the measurement apparatus is adapted to determine from said virtual shape at least one parameter of said object, said parameter comprising at least one of a length, surface area and volume of said object.

2. A measurement apparatus according to claim 1, further comprising an outline definition apparatus configured to define within said image an outline of a shape of said object.

3. A measurement apparatus according to claim 2, further comprising a matching apparatus configured to create a virtual shape which substantially matches said outline.

4. A measurement apparatus according to claim 1, further comprising an alteration apparatus including a function for altering at least one of the size, angle and pitch of said virtual shape so as to substantially match it to said three-dimensional map of said object.

5. A measurement apparatus according to claim 4, wherein said alteration apparatus is adapted such that the function of altering said at least on of size, angle and pitch of said virtual shape is user-controllable.

6. A measurement apparatus as in claim 1, wherein said parameter comprises said surface area.

7. A measurement apparatus as in claim 1, wherein said parameter comprises said volume.

8. A measurement apparatus for measuring at least one parameter of an object, the measurement apparatus comprising:
   at least one imaging device configured to create a three-dimensional map of said object;
   at least one display device configured to display an image of said object based at least in part on said three-dimensional map; and
   a mapping apparatus configured to map a virtual shape onto said image and to substantially match said virtual shape to said three-dimensional map of said object,
   wherein the measurement apparatus is adapted to determine from said virtual shape at least one parameter of said object, said parameter comprising at least one of a length, surface area and volume of said object,
   further comprising at least one calculation device configured to calculate an estimate of materials required to cover said object.

9. A measurement apparatus as in claim 8, wherein said calculation device is configured to calculate said estimate based at least in part on standard material values and quantities.

10. A measurement apparatus as in claim 8, wherein said materials comprise paint.

11. A method of measuring an object, the method comprising:
    creating a three-dimensional map of said object;
    displaying an image of said object, based at least in part on said three-dimensional map;
    creating a virtual shape based on at least one of said three-dimensional map and said image;
    mapping said virtual shape onto said image;
    substantially matching said virtual shape to said three-dimensional map of said object being measured; and
    determining from said virtual shape at least one of a length, surface area and volume of said object.

12. A method according to claim 11, further comprising defining an outline within said image of a shape of said object.

13. A method according to claim 12, wherein the step of creating a virtual shape comprises creating a virtual shape which substantially matches said outline.

14. A method according to claim 11, further comprising altering at least one of the size, angle and pitch of said virtual shape so as to substantially match it to said three-dimensional map of said object being measured.

15. A measurement apparatus for measuring at least one object, comprising:

at least one image capture device configured to capture at least one image of said object;

a three-dimensional map creation apparatus configured to create a three-dimensional map of said object from said at least one image of said object captured by said at least one image capture device;

a display apparatus configured to display in a two-dimensional image space a two-dimensional image of said object based on at least one of said three-dimensional map and said at least one image captured by said image capture device;

a shape matching apparatus configured to map a virtual shape onto said two-dimensional image and to substantially match said virtual shape to said three-dimensional map of said object; and a calculation apparatus to determine from said virtual shape at least one of a length, surface area and volume of said object.

16. A measurement apparatus according to claim 15, wherein said display apparatus is configured to display said two-dimensional image of said object based on said three-dimensional map.

17. A measurement apparatus according to claim 16, wherein said display apparatus is configured to display said two-dimensional image of said object from a selected perspective of said three-dimensional map.

18. A measurement apparatus according to claim 17, wherein said shape matching apparatus is adapted to match said virtual shape to said three-dimensional image based on the selected perspective.

19. An apparatus for estimating a quantity of chosen material required to cover an object, the apparatus comprising:

at least one imaging device configured to create a three-dimensional map of said object;

a shape matching apparatus configured to match a virtual shape to said three dimensional map of said object;

a measurement apparatus configured to determine at least one of a length, surface area and volume of said object; and a calculation apparatus configured to estimate from said matched shape the quantity of chosen material required to cover said object.

* * * * *